UNITED STATES PATENT OFFICE.

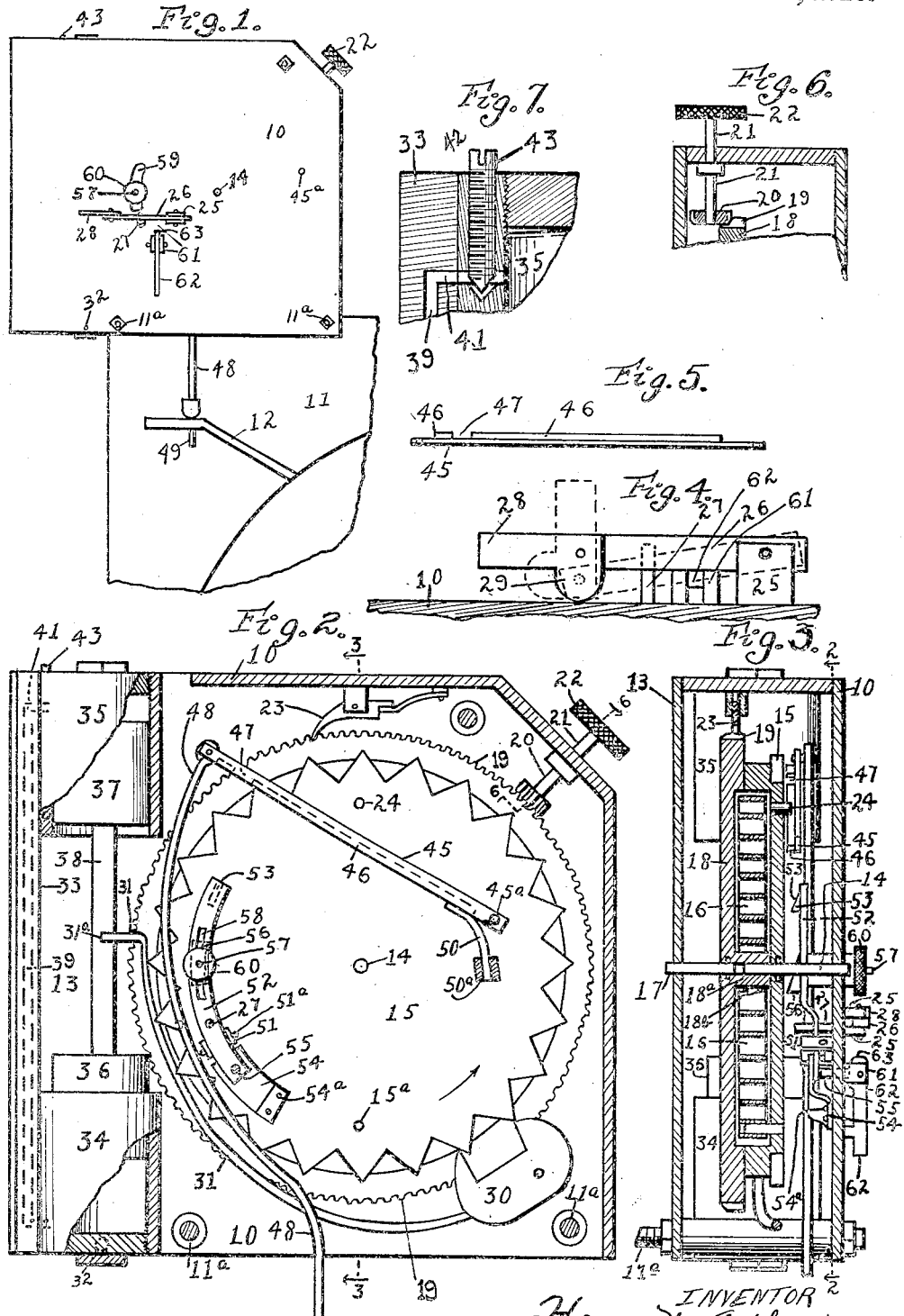
H. W. ARTHUR.
CAMERA SHUTTER CONTROLLING DEVICE.
APPLICATION FILED APR. 30, 1918.
1,354,461. Patented Oct. 5, 1920.

HENRY W. ARTHUR, OF SIOUX CITY, IOWA.

CAMERA-SHUTTER-CONTROLLING DEVICE.

1,354,461.   Specification of Letters Patent.   Patented Oct. 5, 1920.

Application filed April 30, 1918. Serial No. 231,607.

*To all whom it may concern:*

Be it known that I, HENRY W. ARTHUR, a citizen of the United States, and resident of Sioux City, in the county of Woodbury and State of Iowa, have invented a certain new and useful Camera-Shutter-Controlling Device, of which the following is a specification.

The object of my invention is to provide a camera shutter exposure device of simple, durable and inexpensive construction, which is adapted to automatically operate the shutter of a camera after having been properly set, and which includes adjustable members whereby the device may be operated for giving an instantaneous exposure, or for giving time exposures of different lengths.

With this and other objects in view, my invention consists in the construction, arrangement and combination of the various parts of the device, whereby the objects contemplated are attained, as hereinafter more fully set forth, pointed out in my claims, and illustrated in the accompanying drawings, in which:

Figure 1 shows a front elevation of a camera equipped with a shutter controlling device embodying my invention.

Fig. 2 shows a vertical, sectional view taken on the line 2—2 of Fig. 3, the mechanism being viewed from the rear, part of the mechanism being broken away.

Fig. 3 shows a vertical, transverse, sectional view taken on the line 3—3 of Fig. 2.

Fig. 4 shows an enlarged, horizontal, sectional view illustrating the shutter control lever operating mechanism.

Fig. 5 shows a plan view of one of the levers of the device removed from the casing.

Fig. 6 is a sectional view taken on the line 6—6 of Fig. 2; and

Fig. 7 is an enlarged detail view of the governor.

It may facilitate a better understanding of my invention to make a brief statement of the general structure before describing the details of the parts.

My device generally comprises a casing 10 in which is mounted a spring-operated ratchet wheel. Suitable mechanism is provided to be operated from the ratchet wheel for operating the shutter lever of the camera. This mechanism has adjustable members whereby the shutter may be operated for instantaneous exposures or for time exposures of different lengths.

In the accompanying drawings I have used the reference numeral 11 to indicate generally a camera frame. The camera is provided with the ordinary shutter mechanism operated by a shutter control lever 12. The casing 10 is mounted on the frame 11 in any suitable way by passing bolts 11ª through the frame and securing them in place by nuts. The casing 10 is preferably provided with a removable rear wall 13.

Journaled in the front wall of the casing 10 is a short shaft 14, on which is a ratchet wheel 15. Connected with the wheel 15 is a convolute spring 16. Supported on the wall 13 of the casing 10 is a short shaft 17, on which is a gear wheel 18 having teeth 19. Mounted in the wall of the casing is a shaft 21, on which, within the casing, is a pinion 20 meshing with the gear 18. On the outer end of the shaft 21, outside the casing, is a head 22 for the more convenient manual rotation of the shaft 21 for thereby operating the gear 18 for winding up the spring 16. The gear 18 is fixed on the shaft 17, and is provided with a sleeve-like hub 18ª, in which the inner end of the shaft 14 is rotatably received and alined with the shaft 17. The spring 16 is connected with the hub 18ª by means of a suitable lug 18ᵇ.

Pivotally mounted on the casing is a pawl 23, adapted to coact with the teeth 19 of the gear 18 for holding the gear against rotation in one direction, and for thereby preventing the unwinding of the spring in one direction.

For preventing the rotation of the ratchet 15, with the resulting unwinding of the spring in the other direction, there is provided on the ratchet 15 a laterally extending pin 24, shown, for instance, in Fig. 3.

On the outside of the front wall of the casing 10 are spaced members of a bracket 25, between which members there is pivotally mounted a lever 26 which is normally frictionally held against movement in any position which it assumes.

Pivoted to one end of the lever 26, farthest from the bracket 25, is a lever 28 which is pivoted between its ends and has a cam-shaped head or end 29. When the lever 28 is in its position shown in dotted lines in Fig. 4, the pin 27, which is pivotally mounted on the lever 26 and which slidably extends through a suitable opening in the wall of the casing 10, may be pushed to its inner limit of movement, when it will stand in the path of travel of the pin 24, and when in such position will prevent the rotation of the ratchet 15 and the consequent unwinding of the spring 16. When, however, the lever 28 is swung to position with its longer end extending away from the casing 10, the cam-shaped end or head 29 will bear against the wall of the casing for drawing the pin 27 outwardly and moving it out of the path of the pin 24, whereupon the spring 16 will impart rotation to the ratchet 15.

I have found that in the absence of a proper governor, the ratchet 15 would be rotated too rapidly for satisfactory and efficient operation, and I have, therefore, provided a governor device which will now be described:

Pivotally mounted on the frame, in any suitable manner, is a double pawl escapement member 30, illustrated in Fig. 2. Connected with the escapement pawl 30 is a curved resilient wire 31. Pivotally mounted on the casing 10, at 32, is a cylinder supporting frame 33, on which are mounted spaced opposed cylinders 34 and 35. Slidably mounted in the respective cylinders are pistons 36 and 37, which are connected by a common stem 38. One end of the wire 31 is bent to proper shape for projecting into a suitable recess or hole in the stem 38. The outer ends of the cylinders 34 and 35 are connected with each other by means of the small passage 40 communicating with the interior of the cylinder 34, the longer connecting passage 39 and the short passage 41 communicating with the cylinder 35.

Mounted in the wall of the closed end of the cylinder 35 is an adjustable needle valve 43, which projects into the passage 41 and may be adjusted for regulating the size of said passage for thereby regulating the passage of air between the cylinders 35 and 34.

It will be seen that the cylinder structure just described forms a governor for regulating the speed of operation of the resilient wire 31. The movement of the pistons 36 and 37 is always simultaneous and in the same direction. It will be seen that movement of the pistons downwardly forces air from the cylinder 34 through the passages 40, 39, 41 into the cylinder 35. Such passage of air is regulated by the position of the valve 43. By regulating the valve 43, the speed of movement of the pistons may be regulated for thereby regulating the speed of the rotation of the ratchet wheel 15.

Pivotally mounted on the wall of the casing 10 at 45$^a$ is a lever 45 adapted to swing up and down adjacent to the ratchet 15. The lever 45 has on its side adjacent to the ratchet 15, a flange 46 in which is a notch 47, clearly shown in Fig. 5.

Pivotally connected to one end of the lever 45 is a shutter lever actuating arm 48, at the free end of which is a pin 49 adapted to enter a suitable opening in the shutter controlling lever 12, as illustrated in Fig. 1. The parts are so arranged that when the ratchet 15 is permitted to rotate, the pin 24 thereon will engage the flange 46 and slide on said flange, at the same time forcing the lever 45 downwardly for causing the arm 48 to actuate the shutter controlling lever 12. When the pin 24 reaches the notch 47, it passes through said notch and permits the raising of the lever 45.

As a matter of fact, there is in all the ordinary cameras a spring for holding the shutter lever 12 in its raised position, but in order to furnish proper foundation for my claims, I have shown a spring 50 mounted in the brackets 50$^a$ extended from the front wall of the casing 10, adapted to normally hold the lever 45 in its raised position. Ordinarily, however, the spring which holds the lever 12 in its raised position is sufficient for the purpose. It will be seen that as soon as the pin 24 passes through the notch 47, the spring 50 will raise the lever 45.

For instantaneous exposures, the handle 22 is rotated to wind the spring 16, which will cause the pin 24 to be moved with the ratchet 15 till it engages the pin 27, which will extend into the path of the pin 24 when levers 26 and 28 are in the dotted line position shown in Fig. 4. If the levers be moved to the full position, the pin 27 will be moved out of the way of the pin 24 and allow the ratchet 15 to rotate until the pin 24 engages the flange 46 to depress the lever 45, arm 48 and shutter lever 12, to thereby operate the latter for an instantaneous exposure. The lever 26 should meanwhile be returned to position to place the pin 27 in the path of the pin 24 to stop the further movement of the ratchet 15.

It is, however, desirable to provide mechanism whereby the arm 48 can be held for a short time in its lowered position for the purpose of securing a time exposure, and for this purpose I have provided mechanism which will now be described.

Pivotally mounted between its ends on a bracket 51 on the frame 10 is a resilient lever 52 having at its upper end a catch member 53. The catch member 53 is designed to stand in the path of travel of the lever 45, and has a beveled face, as shown in Fig. 3, so arranged that as the lever 45 travels downwardly it will engage the beveled face of the catch member 53 until it passes said catch member. The lower end of the lever 52 is engaged by a spring 54 secured to the frame 10 at 54$^a$, whereby the catch member 53 is normally held yieldingly in the path of the lever 45, so that as soon as the lever 45 passes the catch member 53 on its downward movement, the catch member 53 will be sprung to position for preventing the return of the lever 45.

When it is desired to make instantaneous exposures the lever 52 is moved to position for holding the catch member out of the path of the lever 45 by the following means:

Slidably mounted in the wall of the casing 10 is a pin 55 which may be made to engage the lower end of the lever 52 below the pivot point thereof, and to force said lower end against the pressure of spring 54 for moving the upper end of the lever having the catch member 53, out of the path of the lever 45.

For operating the pin 55 there is mounted on a bracket 61 a lever 62 having a cam-faced head 63. When the lever 62 hangs downwardly, the spring 54 will force the pin 55 outwardly and will hold the lever 52 in position where the catch member 53 is in the path of the lever 45. By swinging the lever 62 upwardly and outwardly, the cam-shaped head 63 may be caused to engage the pin 55 for forcing it inwardly against the pressure of the spring 54 and thereby swinging the catch member 53 out of the path of said lever 45.

Slidably mounted on the lever 52 in the path of the pin 24 is a beveled-faced member 56, having a screw-threaded stem 57 slidably extended through an elongated slot 58 in the lever 52. The lever 52 is curved, as shown in Fig. 2, on the arc of a circle having its center at the center of the shafts 17 and 14, which are alined with each other, and the catch member 53 and the bevel-faced member 56 stand in the path of travel of the pin 24.

The wall of the casing 10 is provided with an opening 59 to permit movement of the nut 60 with the pin 57, and for permitting the adjustment of the member 56 on the lever 52.

I will now describe the practical operation of my improved shutter controlling device.

In the operation of my improved device, the spring is first wound up by rotating the head 22, whereby rotation is imparted to the gear 18 for winding up the spring 16. The ratchet 15, which is connected with the spring 16, is held against rotation by engagement of the pin 24 with the pin 27. After the spring has been wound up, the device is ready for use.

If it is desired to make an instantaneous exposure, the lever 62 is raised for moving the pin 55 inwardly and moving the lever 52 on its pivot point 51ᵃ against the pressure of the spring 54, to such position that the catch member 53 is out of the path of the lever 45. The operator may then manipulate the lever 28 for drawing the pin 27 out of the path of the pin 24, whereupon the spring 16 will rotate the ratchet 15. The operator can then step back to position to be in the picture, if he desires.

The speed of rotation of the ratchet wheel is limited by the escapement or governor device hereinbefore described. As the ratchet wheel 15 moves in the direction indicated by the arrow in Fig. 2, it operates the pawl 30 for moving the pistons 36 up and down. Their speed of movement is limited by the size of the air passage through the valve casing 42, and the size of this air passage is regulated by the position of the needle valve 43.

When the ratchet wheel 15 is rotated to the proper position, the pin 24 will engage the lever 45. It will be understood that the camera should be set in the first place for an instantaneous exposure. With many cameras an instantaneous exposure is obtained by pressing the lever 12 downwardly, and it makes no difference how long said lever is held down. The pin 24 will force the lever 45 downward, carrying with it the shutter lever actuating arm 48 and thereby actuating the shutter lever 12 for the instantaneous exposure. As the ratchet 15 rotates, the pin 24 will slide on the flange 46 until it reaches the opening or notch 47, whereupon the pin 24 will pass through said notch and the spring 50 will raise the lever 45 to its starting position.

It will be understood that after the pin 27 has been withdrawn, it should be immediately moved back to its inward position. It will then occur that shortly after the pin 24 passes through the notch 47, it will engage the pin 27, and the operation of the device will then be stopped until the pin 27 is again withdrawn.

It will be understood that a majority of the cameras now used are provided with a shutter operating lever so arranged that when the controlling lever is moved to a predetermined position then a downward pressure on the controlling lever will hold the shutter of the camera open as long as the lever is held down, and allow the shutter to close as soon as the lever is released to permit it to move upwardly. When it is desired to take a time exposure controlled by my attachment, I arrange the camera shutter control so that its operation will be as just described. The lever 62 is then moved to its position shown in Fig. 3, whereupon the catch member 53 will stand in the path of the lever 45. When the pin 27 is withdrawn, the spring will operate the ratchet wheel and the pin 24 will again move to position for engaging the flange 46 on the lever 45. The lever 45 in its downward movement will engage the member 53, forcing the lever 52 outwardly slightly until the lever 45 passes the member 53, whereupon the member 53 will engage the lever 45 for preventing its upward movement.

At this time the pin 24 passes through the notch 47, but the spring 50 will not return the lever 45 on account of the engagement of the member 53 with the lever 45. As the pin 24 continues its travel, it engages the member 56 and forces the upper end of the lever 52 away from the lever 45 for releasing the lever 45 and permitting the spring 50 to return the lever 45 to its starting position.

It will be seen that the shutter actuating lever 12 will be held down for that period of time during which the pin 24, after it has passed through the notch 47, moves downwardly for engaging the member 56. This period of time may be varied by regulating the needle valve 43 and thereby regulating the speed of movement of the ratchet wheel 15 and the pin 24 thereon, and also by regulating the position of the member 56 on the member 52.

The advantage of a device of this kind can be readily seen from the foregoing description. It enables the camera to be set so that the operator can step to position to be in the picture, or can devote his time to arranging the subject of the picture, as he may desire. The time of exposure may be accurately regulated to suit the necessities of the case.

Many changes may be made in the construction and arrangement of the parts, without departing from the essential features and purposes of my invention. Different types of governors and actuating mechanism may be used, and the other parts may be changed, and it is my intention to cover by my claims any modified forms of structure or use of mechanical equivalents which may be reasonably included within the scope of my claims.

I claim as my invention:

1. In a device of the class described, an actuating member, a latch device adapted to coact with said member when in one position, means for moving said actuating member to said position, and means for operatively connecting the latch device with said means whereby further movement thereof may release said latch device.

2. In a device of the class described, an actuating member, a latch device adapted to coact with said member when in one position, means for moving said actuating member to said position, and adjustable means for operatively connecting the latch device with said means whereby further movement thereof may release said latch device.

3. In a device of the class described, a casing, a shaft therein, a wheel mounted on said shaft, means for rotating said wheel at a predetermined speed, a lug extended from the wheel, a manually operable stop device mounted in the casing and adapted to extend into the path of said lug, a lever mounted in said casing in the path of said lug whereby travel of the lug will move the lever from one position to a second position, a latch device mounted in the casing and adapted to hold the lever in the second position, manually operable means for rendering the latch inoperative, and manually adjustable means for causing further travel of the lug to render the latch inoperative.

4. In a device of the class described, a casing, a shaft therein, a wheel mounted on said shaft, means for rotating said wheel at a predetermined speed, a lug extended from the wheel, a manually operable stop device mounted in the casing and adapted to extend into the path of said lug, a lever mounted in said casing in the path of said lug whereby travel of the lug will move the lever from one position to a second position, a latch device mounted in the casing and adapted to hold the lever in the second position and manually adjustable means for causing further travel of the lug to render the latch inoperative.

5. In a device of the class described, a casing, a shaft therein, a wheel mounted on said shaft, means for rotating said wheel at a predetermined speed, a lug extended from the wheel, a manually operable stop device mounted in the casing and adapted to extend into the path of said lug, a lever mounted in said casing in the path of said lug whereby travel of the lug will move the lever from one position to a second position, a latch device mounted in the casing and adapted to hold the lever in the second position, and means for causing further travel of the lug to render the latch inoperative.

Des Moines, Iowa, April 23, 1918.

HENRY W. ARTHUR.